Aug. 6, 1940.  G. H. JOHNSON  2,209,977
LID SUPPORT
Filed Aug. 5, 1936  2 Sheets-Sheet 1
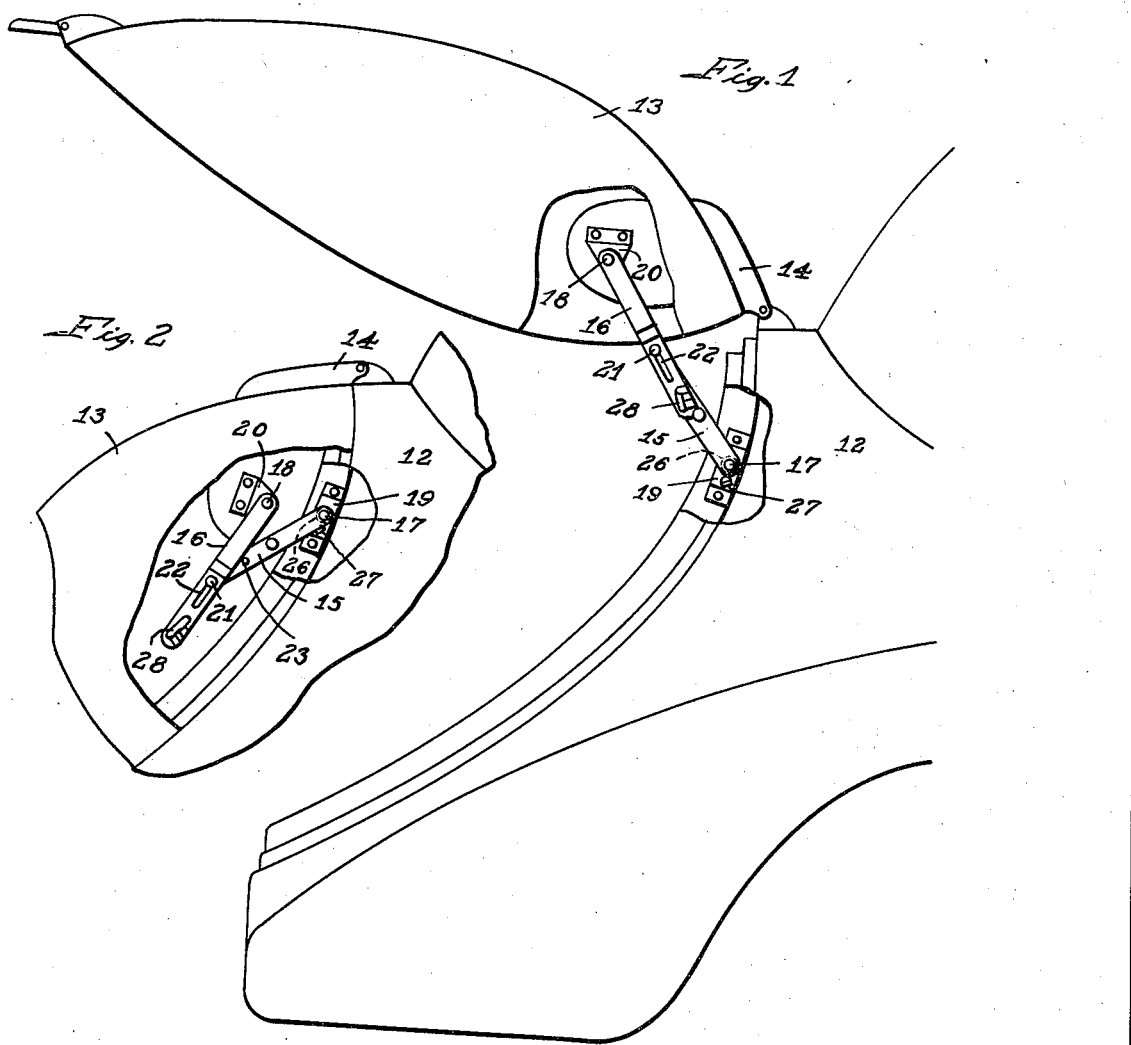
Inventor:
By George H. Johnson
Wilson, Dowell, McCanna & Wintercorn
Attys Aug. 6, 1940.  G. H. JOHNSON  2,209,977
LID SUPPORT
Filed Aug. 5, 1936  2 Sheets-Sheet 2
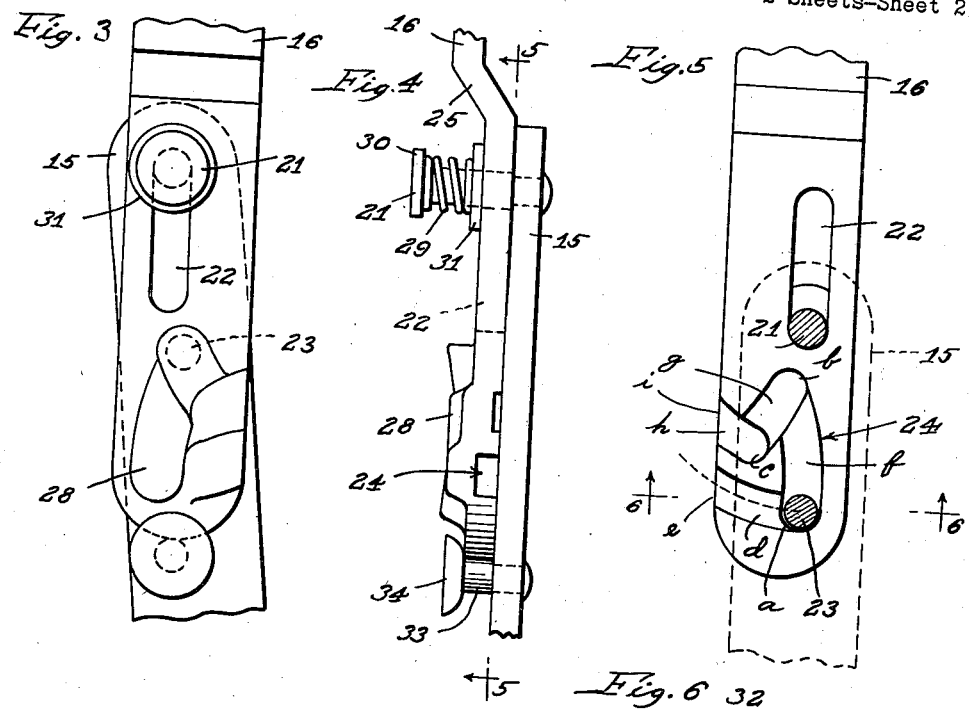
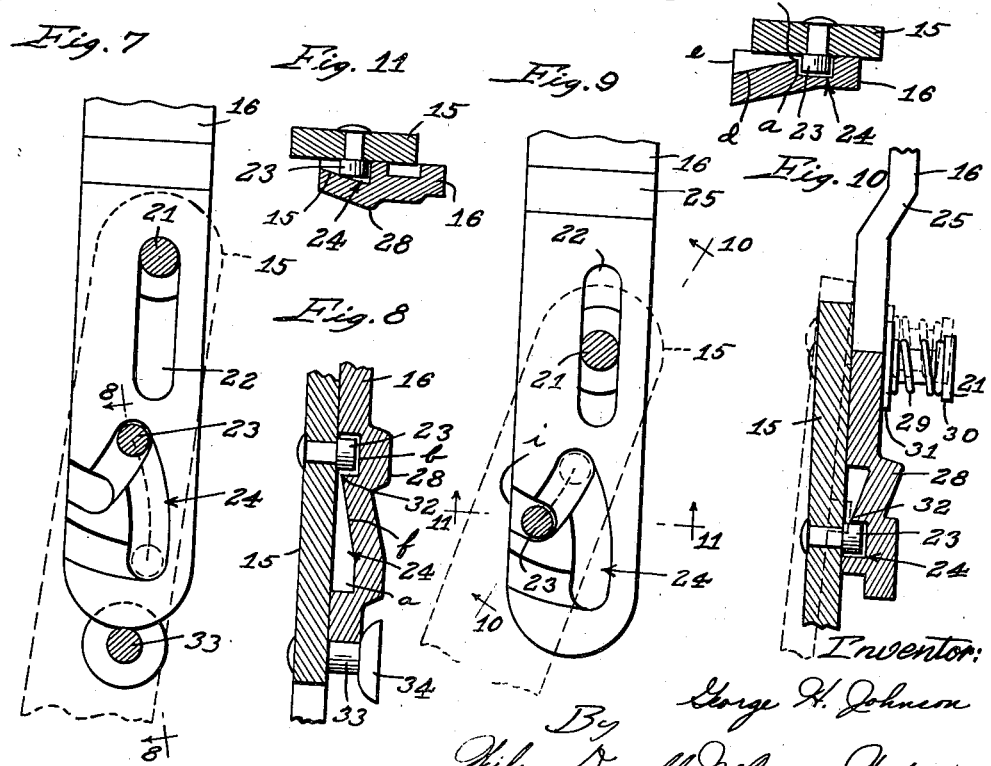
Inventor:
George H. Johnson
By Wilson, Dowell, McCanna & Wintercorn
Attys.

Patented Aug. 6, 1940

2,209,977

UNITED STATES PATENT OFFICE 2,209,977

LID SUPPORT

George H. Johnson, Rockford, Ill., assignor to The Atwood Vacuum Machine Company, Rockford, Ill., a co-partnership composed of Seth B. Atwood and James T. Atwood Application August 5, 1936, Serial No. 94,304

14 Claims. (Cl. 217—60)

This invention relates generally to supports for liftable hinged closures, and is more particularly concerned with a support for the lid of a luggage compartment on an automobile or other vehicle. Supports similar to what have been used on phonograph cabinet lids have been found unsuitable for use on automobiles because of the danger involved of serious injury in the event the lid on a rear trunk or luggage compartment, for example, should fall accidentally while the motorist is putting in or removing articles from the compartment. The danger, of course, is greatly increased when such supports are used on heavier lids, as, for example, on the large engine hoods used on the streamline automobiles. It is, therefore, the principal object of my invention to provide a support having two pivotally connected arms pivotally attached to the body and lid at their remote ends and equipped with a special form of coacting pin and cam track means at their pivotally connected ends for automatically locking the arms in supporting relation, whereby to insure the same safe degree of positive locking in each operation of the lid.

Many earlier types of supports were objectionable from the standpoint that the arms when swung into alignment to support the lid would not always interlock as intended in response to certain movements of the lid, and it would require repeated movements of the lid to get the arms in place to support the lid. The salient feature of the support of my invention is the ratchet action which positively insures proper setting of the arms on the first operation. The cam track provided in accordance with my invention on one of the arms is stepped, with inclined surfaces extending from one step to the next, and provision is made so that the coacting pin rides up one inclined surface after another, thus ratcheting or positively indexing the arms from position to position in a predetermined cycle.

Other supports have also been subject to the objection that the projection relied upon for support by engagement in a recess provided therefor in the other arm was apt to become disengaged by reason of excessive play between the arms, and thus allow the lid to drop. In the support of my invention, the arms are not only resiliently urged toward each other under spring pressure to maintain proper engagement of the pin and track, but a headed pin on one arm wedgingly engages the other arm when the arms are in supporting position, whereby to keep the arms in tight engagement, and thus prevent disengagement of the pin from the track.

The invention is illustrated in the accompanying drawings, in which—

Figure 1 is a side view of the rear portion of an automobile, showing a support made in accordance with my invention holding the lid of the luggage compartment in open position;

Fig. 2 shows the lid closed and the support folded;

Fig. 3 is a side view of the interlocked ends of the arms in supporting relation;

Fig. 4 is a front view of Fig. 3;

Fig. 5 is a section taken on the line 5—5 of Fig. 4, showing the cam track, but with the other arm in a moved position, as indicated in dotted lines;

Fig. 6 is a sectional detail on the line 6—6 of Fig. 5;

Fig. 7 is another section similar to Fig. 5, but showing the other arm in a second position;

Fig. 8 is a sectional detail on the line 8—8 of Fig. 7;

Fig. 9 is another section similar to Figs. 5 and 7, but showing the other arm in a third position;

Figs. 10 and 11 are sectional details on the correspondingly numbered lines of Fig. 9.

Referring first mainly to Figs. 1 and 2, the reference numeral 12 designates the luggage compartment of an automobile, and 13 its lid or door hinged, as indicated at 14, to permit raising and lowering to and from the open position illustrated in Fig. 1. The support of the present invention constitutes an improvement on that disclosed in my copending application Serial No. 35,559, filed August 10, 1935, and, like that support, comprises two supporting arms or links 15 and 16 pivotally attached at 17 and 18, respectively, to the side wall of the luggage compartment 12 and edge portion of the lid 13, as shown. Brackets 19 and 20 are riveted or otherwise suitably secured to the body and lid to provide the pivot supports. The arms 15 and 16, similarly as in the earlier application, have a pin and slot pivotal connection at their free ends, the headed pin 21 carried on the arm 15 being slidable in a slot 22 extending lengthwise of the outer end of the arm 16. A pin or stud 23 mounted on the arm 15 in inwardly spaced relation to the pin 21 is arranged to enter a cam track 24 in the end of the arm 16 in outwardly spaced relation to the longitudinal slot 22. The offset 25 in the arm 16, in inwardly spaced relation to the slot 22, permits the arm 15 to swing alongside the arm 16 in folding, without having the pin 23 strike the arm 16. The pivot 18 can be a plain rivet allowing free swinging of the arm 16, but the pivot 17 preferably includes a spring washer 26 compressed under the arm 15 to provide frictional drag. Then too, there is a lug 27 projecting from the pivot support 19 arranged to limit the downward swinging movement of the arm 15, as appears in Fig. 2, whereby to keep the arms from protruding into the luggage compartment where they might interfere with or damage luggage therein.

In accordance with the present invention, the cam track 24 is formed by extrusion of the metal in the arm 16 between dies, as indicated at 28, so that stock of medium thin section can be used in the arms for lightness and cheapness, and so that expensive machining operations can be eliminated with a resultant further saving in cost. However, it will be understood that I do not limit my invention to the extruded construction, inasmuch as that is only one of a number of possible and practical ways of obtaining the desired form of cam track 24. The track 24 comprises three distinct steps or recesses a, b and c with an inclined surface d leading from the entrance e to the first step a; a second incline f leading from the first step a to the second step b; a third incline g leading from the second step b to the third step c, and a final incline h leading from the third step c to the exit i. Now, the pin 23, in order to ride up say the incline d to the first step a, must necessarily have provision for the arms 15 and 16 to separate to a slight extent, and for that reason I provide a coiled compression spring 29 under the head 30 of the pin 21 and bearing against a washer 31 slidable on the arm 16. The pin in riding up the incline, whether it be d, f, g, or h, cannot leave the track 24, because the "high" point of each of these inclines is slightly below the plane of the face of the arm 16, as indicated at 32. Thus, it is clear that once the pin enters the track 24 at e and has slid up the incline d to the first step or recess a, the cycle from a to b to c and out must be completed; there is no way for the pin to back up. The pin reaches the first step or recess a when the lid is raised as far as it will go, the arms then assuming the position illustrated in Fig. 5. Then, when the lid is lowered slightly, the pin 23 moves up the incline f to the second step or recess b, as illustrated in Fig. 7, the other pin 21 at the same time reaching the upper end of the slot 22. The arms stay in this relationship so long as the lid is held in raised position. Now it will be observed that a third pin 33 provided on the arm 15 in inwardly spaced relation to the pins 21 and 23 has an enlarged button-shaped head 34 which comes into engagement with the end of the arm 16 at the same time that the pins 23 and 21 arrive at the positions shown in Fig. 7. The head 34 positively prevents side play of the one arm with respect to the other which might result in disengagement of the pin 23 from the recess b. Of course, the spring 29 is always active to urge the arms toward one another, but it must be recognized that the spring is yieldable, and for that reason I provide this positive means of locking the arms together.

In operation, assuming the arms are folded as in Fig. 2, when the lid 13 is raised, the arm 16 first slides relative to the pin 21 on the arm 15 until the pin reaches the end of the slot 22, whereupon the arm 15 commences to swing upwardly with the arm 16 as the lid is raised. When the lid is raised as far as it will go, that is, when the arms 15 and 16 are in coextensive relation, as in Fig. 5, the pin 23 snaps into the recess a with a definite clicking sound, owing to the recoil of the spring 29 which is first slightly compressed and then expands again as the pin rides up the incline d and into the recess a. The operator then lowers the lid until the pin 23 drops into the second recess b with another click. The lid is then securely supported, because the arms are held together by the pins 21 and 33 while the pin 23 is engaged in the recess b, as previously explained. When the lid is to be closed again, the operator merely raises the lid enough to cause the pin 23 to ride from the recess b into recess c, which it does with a clicking sound. This brings the arms to the relationship shown in Fig. 9. Then, the lid can be lowered and the arms will fold to the relationship shown in Fig. 2. It is obvious that all uncertainty in the functioning of the arms is eliminated by the ratcheting action just described. The support will operate positively on the first movement of the lid. There is furthermore no danger whatever of the support failing, inasmuch as the arms are locked together securely when in supporting relationship.

It is believed the foregoing description conveys a good understanding of the objects and advantages of my invention. The appended claims have been drawn with a view to covering all legitimate modifications and adaptations.

I claim:

1. As an article of manufacture, a lid support comprising two elongated flat bars, each having a pivot on one end, a pivot pin on the other end of one bar, the second bar having a longitudinally extending slot provided near the other end thereof slidably receiving said pivot pin, a supporting projection on the first bar in inwardly spaced relation to the pivot pin, the second bar having a cam track provided thereon in outwardly spaced relation to the slot to be engaged by the end of said projection, the track comprising a plurality of spaced recesses for reception of the projection in a plurality of different positions of the bars relative to one another, and inclined cam surfaces extending from the bottom of one recess to the top of the next, and from the bottom of the latter recess to the top of the third recess, whereby to predetermine the course of one-way travel of the projection and accordingly predetermine the movements of the bars relative to one another in folding in inoperative relation and cocking in operative relation.

2. An article of manufacture as set forth in claim 1, including spring means normally urging said bars yieldingly toward one another.

3. An article of manufacture as set forth in claim 1, including a second projection on the first bar in inwardly spaced relation to the supporting projection and arranged to engage the end of the second bar when in cocked position so as to hold said bars in close operative relation.

4. An article of manufacture as set forth in claim 1, including spring means normally urging said bars yieldingly toward one another, and a second projection on the first bar in inwardly spaced relation to the supporting projection and arranged to engage the end of the second bar when in cocked position so as to hold said bars in close operative relation.

5. An article of manufacture as set forth in claim 1, wherein the "high" point of each of said inclined surfaces is in depressed relation to the inner surface of said second bar.

6. As an article of manufacture, a lid support comprising two elongated flat bars, each having a pivot on one end, a pivot pin on the other end of one bar, the second bar having a longitudinally extending slot provided near the other end thereof slidably receiving said pivot pin, a supporting projection on the first bar in inwardly spaced relation to the pivot pin, the second bar having a cam track provided thereon in outwardly spaced relation to the slot to be engaged by the end of said projection, the track comprising a plurality of spaced recesses for reception of the projection in a plurality of different positions of the bars relative to one another, and inclined cam surfaces extending from the bottom of one recess to the top of the next, and from the bottom of the latter recess to the top of the third recess, whereby to predetermine the course of one-way travel of the projection and accordingly predetermine the movements of the bars relative to one another in folding in inoperative relation and cocking in operative relation, and a coiled compression spring on said pivot pin arranged to engage the outer side of said second bar to urge the bars yieldingly toward one another.

7. As an article of manufacture, a lid support comprising two elongated flat bars, each having a pivot on one end, a pivot pin on the other end of one bar, the second bar having a longitudinally extending slot provided near the other end thereof slidably receiving said pivot pin, a supporting projection on the first bar in inwardly spaced relation to the pivot pin, the second bar having a cam track provided thereon in outwardly spaced relation to the slot to be engaged by the end of said projection, the track comprising a plurality of spaced recesses for reception of the projection in a plurality of different positions of the bars relative to one another, and inclined cam surfaces extending from the bottom of one recess to the top of the next, and from the bottom of the latter recess to the top of the third recess, whereby to predetermine the course of one-way travel of the projection and accordingly predetermine the movements of the bars relative to one another in folding in inoperative relation and cocking in operative relation, a coiled compression spring on said pivot pin arranged to engage the outer side of said second bar to urge the bars yieldingly toward one another, and a second projection on the first bar in inwardly spaced relation to the supporting projection and arranged to engage the end of the second bar when in cocked position so as to hold said bars in close operative relation.

8. As an article of manufacture, a lid support comprising two elongated flat bars, each having a pivot on one end, a pivot pin on the other end of one bar, the second bar having a longitudinally extending slot provided near the other end thereof slidably receiving said pivot pin, a supporting projection on the first bar in inwardly spaced relation to the pivot pin, the second bar having a cam track provided thereon in outwardly spaced relation to the slot to be engaged by the end of said projection, the track comprising a plurality of spaced recesses for reception of the projection in a plurality of different positions of the bars relative to one another, and inclined cam surfaces extending from the bottom of one recess to the top of the next, and from the bottom of the latter recess to the top of the third recess, whereby to predetermine the course of one-way travel of the projection and accordingly predetermine the movements of the bars relative to one another in folding in inoperative relation and cocking in operative relation, said second bar having metal displaced from the inner side thereof to form said recesses and surfaces in recessed relation to the inner surface, the displaced metal projecting from the outer side of said bar.

9. As an article of manufacture, a lid support comprising two elongated flat bars, each having a pivot on one end, a pivot pin on the other end of one bar, the second bar having a longitudinally extending slot provided near the other end thereof slidably receiving said pivot pin, a supporting projection on the first bar in inwardly spaced relation to the pivot pin, the second bar having a cam track provided thereon in outwardly spaced relation to the slot to be engaged by the end of said projection, the track comprising a plurality of spaced recesses for reception of the projection in a plurality of different positions of the bars relative to one another, and inclined cam surfaces extending from the bottom of one recess to the top of the next, and from the bottom of the latter recess to the top of the third recess, whereby to predetermine the course of one-way travel of the projection and accordingly predetermine the movements of the bars relative to one another in folding in inoperative relation and cocking in operative relation, the "high" point of each of said inclined surfaces being in depressed relation to the inner surface of said second bar, and a coiled compression spring on said pivot pin arranged to engage the outer side of said second bar to urge the bars yieldingly toward one another.

10. In a device of the class described, an arm having one end hinged to a receptacle, another arm slidable and pivotal relative to the first arm and having one end hinged to a lid for said receptacle, a projection on the inner side of one of said arms spring pressed toward slidable engagement with a cam track provided on the inner side of the other arm, stop means on said cam track engageable by the projection in relative sliding and pivotal movement between said arms to limit extension and contraction thereof so as to limit lid lifting movement and thereafter support the lid in raised position, and means on said cam track slidably engaged by the projection in traveling between said stop means to prevent retrograde movement, whereby to predetermine the movements of the arms relative to one another in folding in inoperative relation and cocking in operative relation.

11. A latch mechanism comprising, in combination, a pair of relatively movable members, a projection on the one member, the second member having a cam track provided thereon with which said projection is adapted to come into and out of engagement in the relative movement of said members, the track comprising a plurality of spaced recesses for reception of the projection in a plurality of different positions of the members relative to one another, and inclined cam surfaces extending from the bottom of one recess to the top of the next, and from the bottom of the latter recess to the top of the third recess, whereby to predetermine the course of one-way travel of the projection and accordingly predetermine the movements of the members relative to one another through a cycle of operation.

12. A latch mechanism as set forth in claim 11, including spring means normally urging said projection and cam track yieldingly toward engagement with one another.

13. A latch mechanism comprising, in combination, a pair of pivotally and slidably connected arms, a projection on the inner side of one of said arms arranged to slidably engage a cam track on the inner side of the other arm, said track having a main recess provided therein to receive said projection in the cocked position of said arms, said track also having at least two other secondary recesses therein in spaced relation to said main recess to receive said projection in other predetermined positions assumed by said arms in folding and unfolding, and said track having inclined bottom surfaces between said recesses rising from the bottom of the first recess to the top of the second recess and from the bottom of the second recess to the top of the third recess and arranged to be engaged by the end of said projection in moving from recess to recess, whereby to predetermine the course of one-way travel of the projection and accordingly predetermine the movements of the arms relative to one another in folding in inoperative relation and cocking in operative relation.

14. An escapement mechanism for detachably inter-locking two members adapted to have back and forth movement relative to one another, said mechanism comprising a two ended cam track carried on one of said members and a follower projection carried on the other of said members adapted to go into and out of engagement with the cam track in the relative movement of the members in each cycle of operation, said cam track outlining a path of movement for said follower projection from the entrance end of the track to the exit end whereby to cause said members to be detachably secured in different positions with respect to one another when the follower projection reaches different positions in the track, means defining stop shoulders on said track at points spaced lengthwise thereof engageable by the follower projection to prevent retrograde movement, and means defining inclined surfaces on the track leading to each of said stop shoulders to guide the follower projection past each of said stop shoulders in the forward travel of the follower projection toward the exit end of the cam track.

GEORGE H. JOHNSON.